(12) United States Patent
Cheng et al.

(10) Patent No.: US 8,370,425 B2
(45) Date of Patent: Feb. 5, 2013

(54) TRANSIENT NETWORKS

(75) Inventors: Lili Cheng, Bellevue, WA (US); Owen Charles Braun, Seattle, WA (US); Alice Jane Bernheim Brush, Bellevue, WA (US); Mary P. Czerwinski, Woodinville, WA (US); Alex David Daley, Kenmore, WA (US); Susan T. Dumais, Kirkland, WA (US); Dragos A. Manolescu, Kirkland, WA (US); Henricus Johannes Maria Meijer, Mercer Island, WA (US); Simon Christer Muzio, Redmond, WA (US); John Oberon, Seattle, WA (US); Rebecca A. Norlander, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 12/248,251

(22) Filed: Oct. 9, 2008

(65) Prior Publication Data

US 2010/0094939 A1    Apr. 15, 2010

(51) Int. Cl.
*G06F 15/16* (2006.01)
*G06F 15/173* (2006.01)

(52) U.S. Cl. ........ 709/203; 709/204; 709/207; 709/225; 709/230

(58) Field of Classification Search ........... 709/204–207
See application file for complete search history.

(56) References Cited

U.S. PATENT DOCUMENTS

| | | | |
|---|---|---|---|
| 6,425,012 B1 * | 7/2002 | Trovato et al. | 709/227 |
| 7,039,701 B2 * | 5/2006 | Wesley | 709/224 |
| 7,127,613 B2 * | 10/2006 | Pabla et al. | 713/171 |
| 7,249,123 B2 * | 7/2007 | Elder et al. | 1/1 |
| 7,343,365 B2 | 3/2008 | Farnham et al. | |
| 7,716,286 B2 * | 5/2010 | Heins et al. | 709/204 |
| 2002/0087367 A1 | 7/2002 | Azani | |
| 2003/0187973 A1 * | 10/2003 | Wesley | 709/224 |
| 2004/0054729 A1 * | 3/2004 | Fukuizumi et al. | 709/205 |
| 2004/0215793 A1 | 10/2004 | Ryan et al. | |
| 2005/0075917 A1 * | 4/2005 | Flores et al. | 705/8 |
| 2005/0080845 A1 | 4/2005 | Gopinath | |
| 2005/0154693 A1 | 7/2005 | Ebert | |
| 2007/0287436 A1 | 12/2007 | Lovell | |
| 2008/0086261 A1 * | 4/2008 | Robinson et al. | 701/200 |

(Continued)

FOREIGN PATENT DOCUMENTS

WO    WO2008073655 A2    6/2008

OTHER PUBLICATIONS mates: A Location-Based Social Networking System http://grocs.dmc.dc.umich.edu/~mates/. Last accessed Aug. 6, 2008, 6 pages.
Social Network Niche Mixes Events and Communities http://www.demo.com/community/?q=node/28299. Last accessed Aug. 6, 2008, 3 pages.

(Continued)

*Primary Examiner* — Minh-Chau Nguyen
(74) *Attorney, Agent, or Firm* — Lee & Hayes, PLLC

(57) ABSTRACT

The claimed subject matter relates to an architecture that can facilitate creation and management of an event-oriented transient network and can further manage decommission of the transient network. In particular, the architecture can construct temporary communities based upon a particular event, project, or activity; manage (e.g., filter, prioritize, or control) communications and content associated with the community; and disband the community by deconstructing the transient network according to an aging function that controls how the network decays. In addition, the architecture can leverage existing information (e.g. profile data) and content feeds associated with disparate social networking services or communities for the benefit of the temporary community.

19 Claims, 11 Drawing Sheets

U.S. PATENT DOCUMENTS

2008/0091445 A1    4/2008    Mihic
2008/0134298 A1    6/2008    Nathan et al.
2008/0140650 A1    6/2008    Stackpole
2008/0162510 A1*    7/2008    Baio et al. ................. 707/100
2008/0301304 A1*    12/2008    Chitsaz et al. ............. 709/228
2009/0209274 A1*    8/2009    Sangberg et al. ........... 455/462
2010/0159976 A1*    6/2010    Marocchi et al. ........... 455/519

OTHER PUBLICATIONS

Social Network Extraction of Conference Participants http://www2003.org/cdrom/papers/poster/p092/p92-tomobe.html. Last accessed Aug. 6, 2008, 5 pages.

EventVue http://www.eventvue.com/. Last accessed Aug. 6, 2008, 1 page.

* cited by examiner

TRANSIENT NETWORKS

BACKGROUND

The inexorable growth of the Internet in recent times has fostered many new paradigms and new markets for social interaction. In some cases, the Internet has changed the conventional way many people worldwide meet and maintain friends. Today, there are abundant examples of social networking sites and services that aid in forming communities, creating and maintaining personal virtual spaces, managing social circles, personal contacts and communications, content sources and so forth.

Generally, conventional social networking services require a substantial investment in terms of time and effort. Moreover, modern social networking services are designed to encourage persistent relationships and communities. For example, if user A adds user B as a friend or subscribes to user B's weblog (e.g., blog), then the associated state(s) will remain in perpetuity or until user A manually or explicitly removes user B or unsubscribes to the blog. However, many situations exist in which it can be beneficial to form transient, dynamically changing networks or communities, which are not adequately addressed by conventional social networking services or approaches.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can facilitate creation, management, and termination of an event-oriented transient network. In accordance therewith and to other related ends, the architecture can construct a network or community around a specific event, project, or activity. Appreciably, the specific event can serve as a common axis for connecting individuals with similar tastes or interests. However, unlike conventional social networking sites or service, because the network or community is intended to be transitory, there is the inherent recognition that merely because each community member may share a common interest or trait or have overlapping concerns or characteristics at a certain point in time, this does not necessarily imply the community should be maintained as-is in perpetuity.

In more detail, the architecture can receive event data that is associated with the event, which can be, e.g., a description of the event or its purpose or the like. In addition, the architecture can receive a set of tokens, each of which can identify a registrant for the event. The tokens can therefore include profile data or a link to a profile from a third-party social networking service in order to leverage previously input content and/or allow selection of a suitable persona. Based upon information included in the tokens, the architecture can construct the transient community.

In addition, the architecture can decay or dismantle the transient network according to an aging function until the network is ultimately terminated. During the life cycle of the transient network, the architecture can manage content and communication associated with the transient network. For instance, the flow of content can be modulated based upon default rules or even by preferences that can be specific to individual registrants. The flow of content can also be adjusted according to various sensors or other data such as location data, calendar information or the like.

Moreover, content feeds from third-party social networking services as well as other networked sources of information can also be leveraged. For example, suppose the transient network is based upon a nationwide conference. The architecture can construct the transient network by including in this community all or a subset of the attendees registered for the conference. During the life of the transient network, blog posts (as one example) by potentially any person at the conference can be routed to and received by members of the transient network. Such a feature can be desirable to a particular registrant who does not mind receiving content from a potentially random person at the conference while the conference is ongoing, but who does not want to continue receiving the content after the conference (or other event) ends.

Furthermore, the aging function employed to facilitate the decommissioning of the transient network can be adjusted, potentially according to any number of suitable parameters. For example, the rate of decay of the network can depend upon a rate of communication between community members. Thus, a transient network that provides very little interaction can be decayed at a faster rate, while highly active transient networks can be extended in duration. As another example, network nodes representing individual members of the community who are inactive can be decayed at a more rapid pace than the nodes for active participants.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
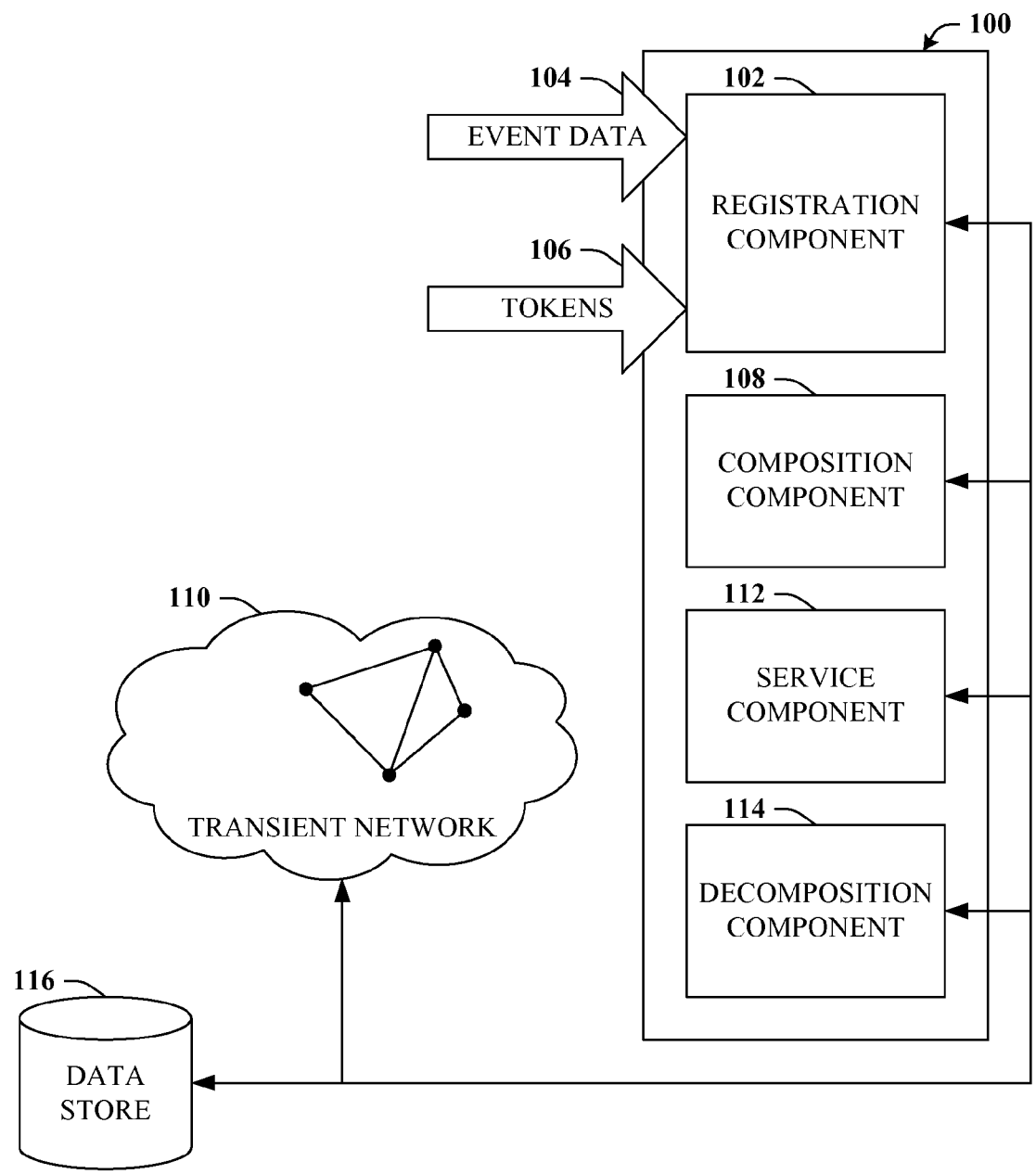
FIG. 1 illustrates a block diagram of a computer-implemented system that can facilitate termination of an event-oriented transient network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the term "declarative" is generally intended to refer to a language, model, or style of description. Typically, a declarative language describes features, function, or relationships, which can be contrasted with an imperative language that describes procedures or state changes, usually in the form of an algorithm. As one example, a declarative language can describe what to render, say a chart, whereas an imperative language focuses on how the chart is rendered. Furthermore, as used herein, the terms "language" and "model" are substantially used interchangeably.

Referring now to the drawings, with reference initially to FIG. 1, computer-implemented system 100 that can facilitate termination of an event-oriented transient network is depicted. Generally, system 100 can include registration component 102 that can facilitate event registration as well as registration of attendees (e.g., registrants) to the event. In accordance therewith, registration component 102 can maintain a web page to facilitate registration for the event, however other means of obtaining event data 104 and tokens 106 can exist that do not require accessing a web page. In an aspect of the disclosed subject matter, registration component 102 can receive event data 104 and a set of tokens 106. Event data 104 can be associated with an event such as, e.g., conference, meeting, project, activity or the like and is intended to identify or describe the event in relatively general terms. For example, event data 104 can include a name of the event; time of the event; location of the event as well as objectives, goals, or mission statements; schedules or agendas; speakers, performers, participants, contributors, or hosts; a description or synopsis, and so forth. Event data 104 can be provided by one or more registrant or can be obtained in other ways as further detailed infra.

In contrast, tokens 106 received by registration component 102 can relate to those who plan on attending the event or otherwise desire to access transient network 110. In particular, token 106 can identify a registrant for the event. Accordingly, token 106 can include the registrant's name as well as a profile associated with the registrant. Additionally or alternatively, token 106 can include a link to a profile associated with the registrant. For example, the link can reference a suitable profile from a disparate social networking site, service, or application. Hence, an existing profile can be imported by registration component 102. Thus, it should be readily apparent that the registrant can provide relevant information to registration component 102 with a minimal amount of effort.

Furthermore, given that a single individual often actively maintains multiple accounts or profiles for different social networking services, one particular profile can be chosen over another profile based upon the nature of the event. For instance, an individual can maintain a professional profile and a casual profile and thus be able to select the professional persona for business-related events, while choosing the more casual persona for, say, personal or entertainment-based events. Appreciably, if available and desired, multiple profiles can be supplied by token 106.

Based upon the information received by registration component 102, particularly information included in tokens 106, composition component 108 can construct transient network 110. Transient network 110 is typically a temporary (e.g., existing only for a limited time) social networking computer-based network that can be created expressly for the aforementioned event and can aid in various collaboration activities for the event by connecting the registrants. For example, composition component 108 can construct one or more network node(s) for each identified registrant (e.g., identified by way of token 106). Service component 112 can be employed to manage content and communication associated with transient network 110, which is considered in further detail in connection with FIGS. 2 and 3, infra. However, as a brief introduction, service component 112 can apply various rules for the distribution of content to the registrants as well as manage profile and contact data between registrants. System 100 can further include decomposition component 114 that can dismantle the transient network 110 according to one or more aging function.

To provide a concrete illustration of the disclosed subject matter, consider Ashley, who plans to attend "Technology Today," a large and well-publicized five-day technology conference. Ashley is very interested in the subject matter of the conference, and excited about several speakers who will be presenting. Moreover, many of Ashley's friends and colleagues will also be in attendance, and from past experiences, she has learned that conferences of this type provide great potential for networking and forming new bonds between people with similar interests.

Ashley is a member of numerous social networking services, actively manages her virtual spaces, often contributes to a personal blog, and has a well-established social circle of contacts with whom she communicates regularly. According to the above, one objective of great interest to Ashley is to join a community or create a social network that substantially includes only individuals attending the technology conference. Thus, blogs or other feeds or content can be accessible to Ashley even from individuals with whom she is unfamiliar, or even from previously unknown individuals. In essence, this new social network is a function of the event rather than a function of her previous personal experiences or interactions. However, rather than continuing to receive content from all these new contacts, Ashley would like the network to expire when the conference ends.

To the accomplishment of these and other related ends, Ashley can navigate to a web page hosted by registration component 102 (or interface in some other suitable manner) to enter information about the conference (e.g., event data 104) and provide identification information (e.g., token 106), potentially including certain personal information such as profile information. Appreciably, some or all of this information can be provided in an automated manner, greatly decreasing the burden of information exchange/input associated with conventional social networking services, which can be further explained with reference to FIG. 2.

Figure 2:
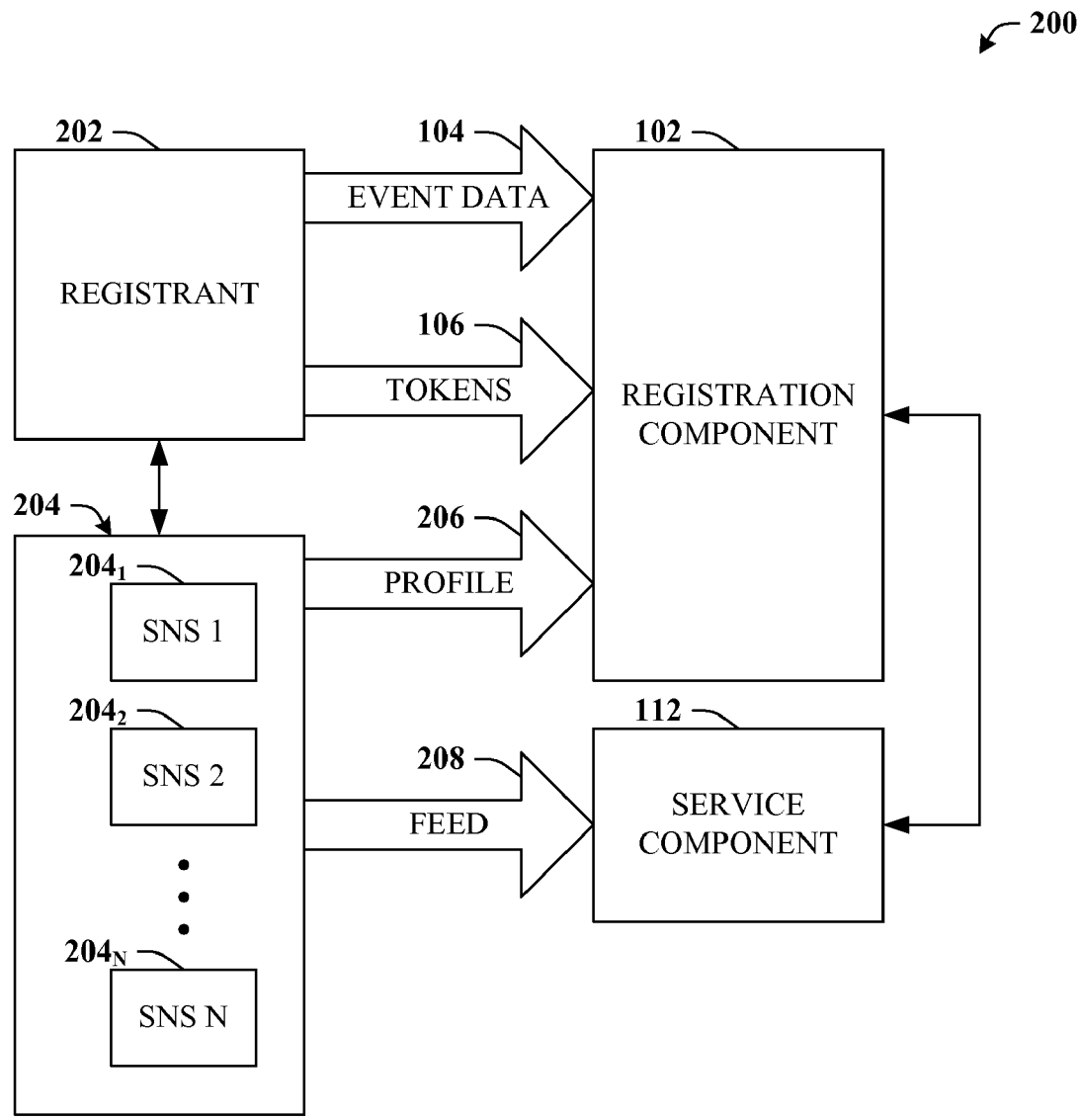
FIG. 2 illustrates a block diagram of a system that can leverage existing information and third-party social networking services.

While still referring to FIG. 1, but turning now also to FIG. 2, system 200 that can leverage existing information and third-party social networking services is illustrated. As described supra, Ashley (e.g., registrant 202) interfaces registration component 102 in some manner to provide token 106 and, optionally, event data 104. Regardless of what information Ashley provides to registration component 102, some or all of the associated information exchange can be automated by leveraging existing information. For example, Ashley can utilize token 106 to link to an existing profile (e.g., profile 206) from a disparate or third-party networking service 204, which can then be imported. The claimed subject matter can potentially leverage any number, N, of disparate third-party social networking services, labeled here as services $204_1$-$204_N$, and referred to herein either collectively or individually as disparate social networking services 204. Event data 104 can also be automatically obtained, for instance, by importing relevant data from a scheduling or calendar application.

Others interested in attending the event (e.g., other registrants 202) can also interface with registration component 102 and supply their own tokens 106 and, potentially, add to or update event data 104. As each token 106 is received, composition component 108 can add another node to transient network 110. Registrants 202 can post content to a content server associated with transient network 110, which can be maintained, distributed, and/or accessed by way of service component 112. In addition, service component 112 can receive content feed 208 from one or more disparate social networking service 204, and post or provide access by other registrants 202 to content feed 208. For example, techniques such as Really Simple Syndication (RSS) and various social networking services (e.g., Twitter-like services) allow others to subscribe to content feeds from a particular contact or known entity. However, in this case, by forming a social network based upon the conference, registrants 202, even those who are not aware of or have had no other contact with Ashley, can receive her content feeds 208 for the duration of the conference or until transient network 110 is dismantled or terminated by decomposition component 114. Additional features, aspects, embodiments, and examples are provided herein.

Continuing the discussion of FIG. 1, it should be understood that system 100 can also include or be operatively connected to data store 116. Data store 116 is intended to be a repository of all or portions of data, data sets, or information described herein or otherwise suitable for use with the claimed subject matter. Data store 116 can be centralized, either remotely or locally cached, or distributed, potentially across multiple devices and/or schemas. Furthermore, data store 116 can be embodied as substantially any type of memory, including but not limited to volatile or non-volatile, sequential access, structured access, or random access and so on. It should be understood that all or portions of data store 116 can be included in system 100, or can reside in part or entirely remotely from system 100.

Figure 3:
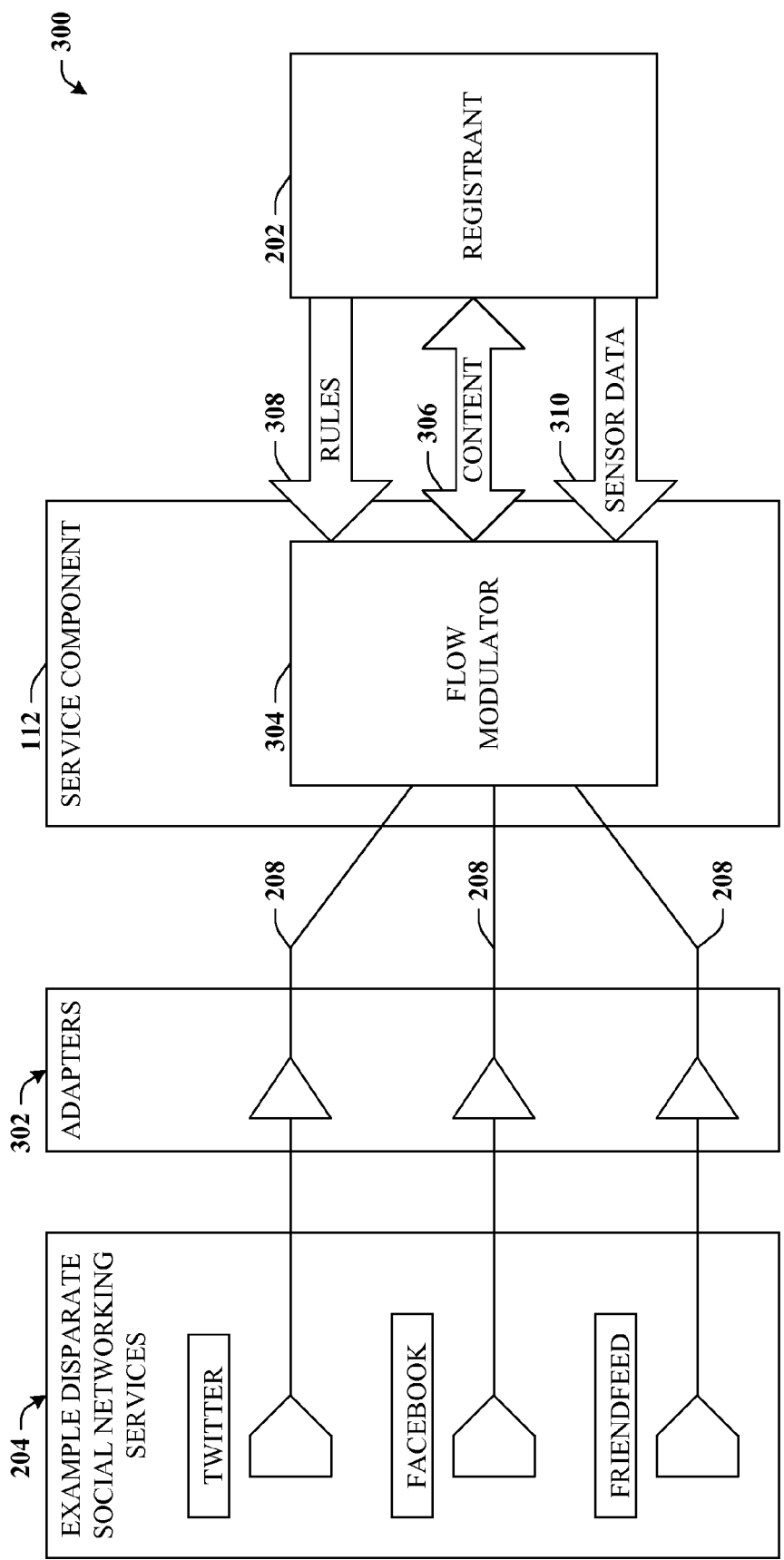
FIG. 3 depicts a block diagram of a system that can provide additional features associated with service component 112.

Referring now to FIG. 3, system 300 that illustrates additional features associated with service component 112 is provided. In this depiction, a number of well-known social networking services are portrayed as example social networking services 204. In particular, Twitter, Facebook, and Friend-Feed are utilized in this example, however it should be appreciated that other suitable social networking services can be utilized in addition to or in lieu of those provided in this example.

Twitter is a well-known social networking and micro-blogging service that allows users to send and read other users' updates, known as "tweets," which are text-based posts of up to 140 characters in length. Updates are displayed on the user's profile page and delivered to other users who have signed up to receive them. The sender can restrict delivery to those in his or her circle of friends if desired. Users can receive updates via the Twitter website, instant messaging, Short Message Service (SMS), RSS, email or through an application. Facebook is a social networking website, wherein users can join networks organized by city, workplace, school, or region to connect and interact with other people. Users can also add friends, send those friends messages, post to another's wall, and create, maintain, and update one's personal profile to advertise personalized characteristics to others. Lastly, FriendFeed is a social networking service that acts as an aggregator that can consolidate updates from many social websites such as blog entries, social bookmarking websites, and social networks among others. This allows individuals using multiple social websites to have a consolidated stream of details on all their activities across these many websites. In essence, FriendFeed allows users to build a customized feed made up of content one's friends on other collaborative sites have shared, including news articles, photos, blogs and so on.

As indicated previously, service component 112 can receive one or more content feed 208 from one or more disparate social networking service 204. As content can differ in various ways, service component 112 can employ an adapter that translates content feed 208 into a format suitable for transient network 110 for some or all disparate social networking services 204. In addition, service component 112 can employ flow modulator 304 in order to control, organize, prioritize, or filter content received from content feed 208 and/or content 306 that is presented to registrant 202. The manner in which flow modulator 304 controls data can be personalized for each registrant 202 and can in some cases be based upon default settings, while in other cases based upon data included in token 106. Additionally or alternatively, registrant 202 can set or modify the manner in which content 306 is received by providing rules 308.

For example, registrant 202 can select certain nodes or sub-networks within transient network 110 and adjust a content flow control for that node or sub-network. The flow control for the selected node or sub-network can range from completely silent (e.g., no data or content should be received from that particular node) to no filtering at all, in which case all content from that source can be received. Likewise, the flow of information can be adjusted not only for persons or groups, but also based upon topics, location, and so on. For instance, a knob, slider, or other control can adjust the flow level for any such category independently from others.

In addition, in order to further aid in controlling content 306 flow, flow modulator 304 can also receive various sensor data 310 from registrant 202 or from another source. Generally, sensor data 310 can include items such as location, schedule information, time, biometric data and the like, and all or portions of such data 310 can be received from various devices or applications associated with registrant 202. Accordingly, in addition to rules 308, sensor data 310 can be employed to modulate the flow of content 306 to registrant 202. For example, during normal business hours (e.g., while the conference is in session) certain content 306 or sources thereof can be favored over others. However, during evenings, conference-related traffic can be diminished to facilitate attention or emphasis on more routine channels. Similarly, certain content 306 can obtain a higher or lower priority based upon the location of registrant 202, as well as the location relative to other registrants 202. Appreciably, content 306 can also be submitted, which can then be delivered or accessible to other registrants 202.

Figure 4:
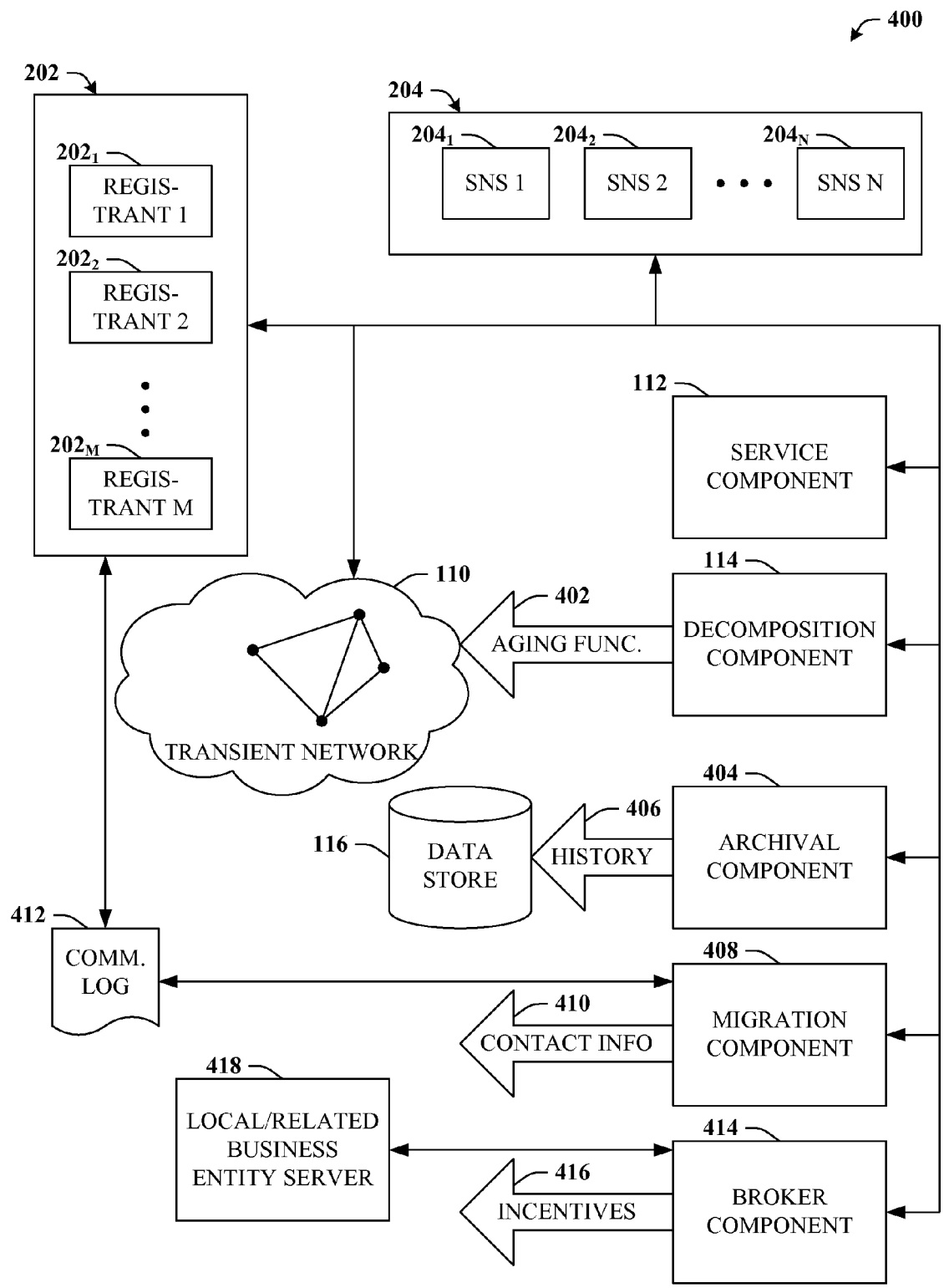
FIG. 4 illustrates a block diagram of a computer-implemented system that can manage a lifecycle for a transient network and provide addition features associated with the transient network or associated event.

Turning now to FIG. 4, computer-implemented system 400 that can manage a lifecycle for a transient network and provide addition features associated with the transient network or associated event is depicted. Generally, system 400 can include service component 112 that can manage content and communication to or from registrants 202 and/or disparate social networking services 204 or that which is otherwise associated with transient network 110 as substantially described supra. Additionally, although not expressly depicted here, system 400 can also include registration component 102 and/or composition component 108.

In addition, system 400 can also include decomposition component 114 that can terminate or decay transient network 110 according to aging function 402. In an aspect, aging function 402 can be based partially or exclusively upon a timeline for the event. For instance, in the most straightforward case, composition component 108 can construct transient network 110 shortly prior to the start of the conference detailed in the above example (or other associated event); while decomposition component 114 can entirely dismantle transient network 110 shortly after the conclusion of the conference, terminating the event-oriented network.

However, in addition or in the alternative, aging function 402 can also be based upon a rate of communication for registrant 202, a rate of communication with a second registrant 202, an aggregate rate of communication for multiple registrants 202, a proximity to an event site or a proximity to other registrants 202, or other suitable criteria. In more detail, and returning again to the illustration introduced above, suppose that Ashley attends the conference but provides little or no input to transient network 110, and further rarely even accesses content other registrants submit. In this case, because her rate of communication is very low, aging function 402 can remove Ashley (e.g., the node associated with Ashley) from transient network 110 prior to general termination of the entire network 110. In contrast, if Ashley avidly participates in transactions associated with transient network 110, aging function 402 can keep Ashley's node active and connected to other nodes in the network 110.

As another example, transient network 110 can be maintained an extended amount of time after the associated event has ended or wound down when, e.g., an aggregate rate of communication for multiple registrants 202 remains at a high level. Thus, even after the conference has ended, if a substantial amount of content is still being created and propagated by way of transient network 110, then aging function 402 can extend the life cycle for transient network 110 or portions thereof In accordance therewith, aging function 402 can ultimately terminate transient network 110 after the rate of communication has diminished a certain amount or when a final time-based deadline is reached.

Furthermore, proximity or location-based factors can also be utilized by aging function 402 for dismantling transient network 110. For instance, links between various registrants 202 can be maintained or abolished based upon physical location. As one example, two registrants who often sit near to one another or travel or make various excursions together can remain connected to each other for a longer period than might otherwise occur. As another example, in the case of an event with a physical or geographic site designation, such as in the example scenario of a conference, then leaving the site or surrounding environs for a substantial amount of time, or traveling an inordinate distance from the site can result in an early decay of the associated network node by aging function 402. Of course, numerous other parameters and/or criteria can exist that can be utilized by aging function 402 and the examples given supra are not necessarily intended to limit the scope of the appended claims.

System 400 can also include archival component 404 that can store history 406 of transient network 110, e.g., upon ultimate termination by decomposition component 114. History 406 can include, inter alia, all or a subset of event data 104 and tokens 106, as well as various states of the transient network 110. Accordingly, even long after the event occurred and/or the associated transient network 110 has been decommissioned, registrant 202 can access or lookup various information associated with the event or network 110. For example, suppose that one year after the Technology Today conference ended, Ashley is visiting the east coast and would like to contact a few of the local residents while she in the area. Ashley recalls that a number of the people she met at the conference live locally, but she does not recall any contact information.

Generally, the associated transient network 110 will have long since expired, however history 406 can still be accessible to facilitate discovery of this and other information. Accordingly, Ashley can access history 406, lookup the contact information she desires, even while her own social network remains streamlined to suit her normal needs without the hassle, confusion, and daunting effort of storing contact information from substantially everyone she meets or communicates with on the off chance the contact will be of some use later, such as when traveling. Moreover, because history 406 can also relate to a state of transient network 110, it is possible to undo certain transactions and/or revert to a previous state.

Figure 5A:
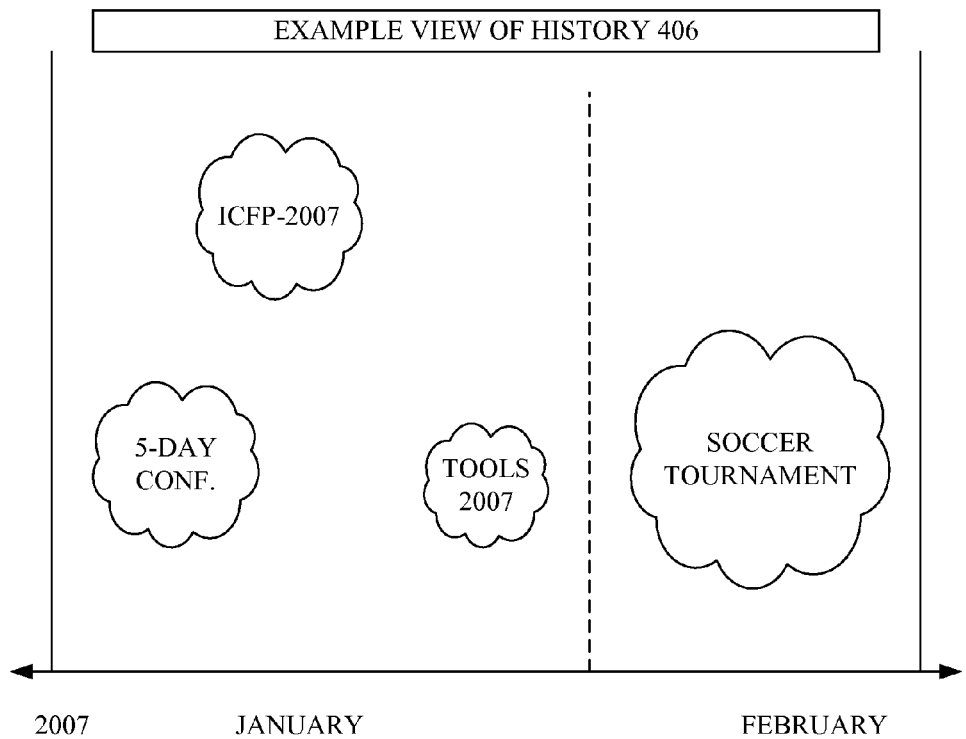
FIG. 5A is a block diagram that provides an example view of history 406.

FIG. 5A provides an example view of history 406 consistent with the foregoing example. When Ashley logs in to or otherwise accesses one of the web pages maintained by registration component 102, she can be presented with a history of the events for which she was an associated registrant 202. As depicted, the 5-day Technology Today conference was held in early January 2007, with other events depicted based upon an adjustable and/or zoomable time line. Clicking on or otherwise selecting the event denoted "5-Day Conf" can present another view with data specific to the Technology Today conference in which Ashley is interested. It should also be noted that while each registered event is typically related to a discrete event, project, or activity, each with its own transient network 110, events can overlap in terms of calendar time.

Figure 5B:
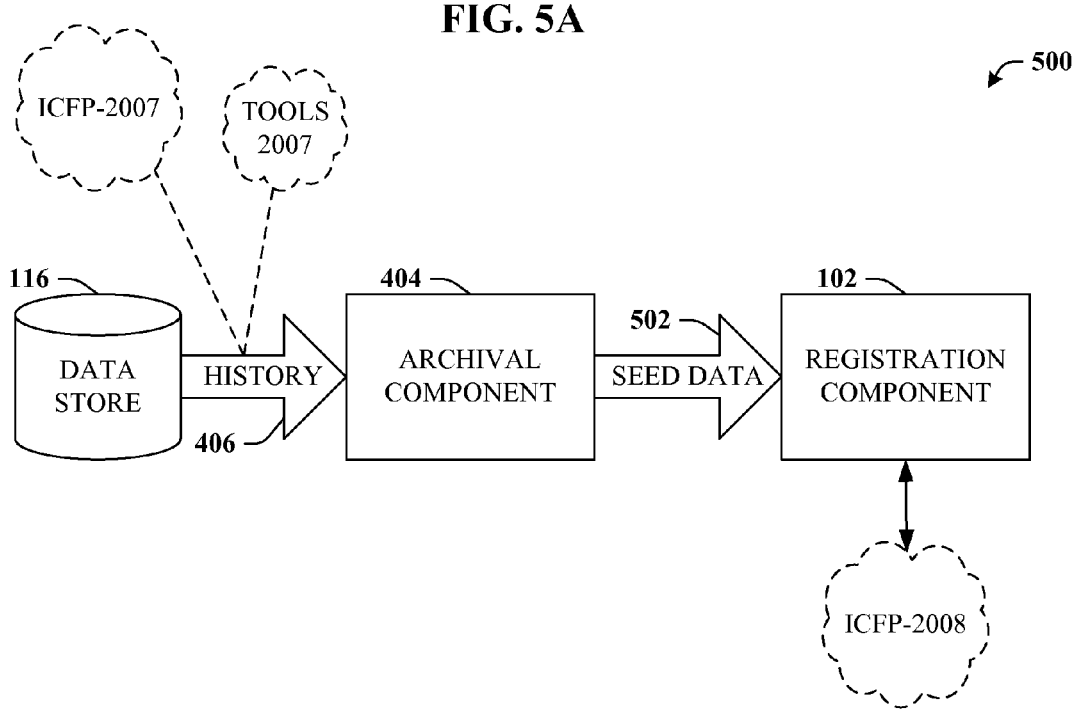
FIG. 5B illustrates a block diagram of a computer-implemented system that can employ history 406 to seed a related event.

In another aspect, history 406 can also be utilized to seed event registration for a subsequent (or concurrent) related event, which is further detailed in connection with FIG. 5B. Referring now to FIG. 5B, system 500 that can employ history 406 to seed a related event is depicted. System 500 can include archival component 404 that, in addition to storing history 406 of transient network 110, can also retrieve said history 406 from data store 116. Hence, one or more events can be utilized as seed data 502. In this case, event data 104 and tokens 106 from, e.g. the ICFP-2007 conference event and the TOOLS-2007 conference event can be collectively used to populate event data 104 and tokens 106 for likely registrants 202 of ICFP-2008, which can be received by registration component 102 as seed data 502. Appreciably, when creating a community from seed data 502 extracted from data relating to previous events, creation of the subsequent transient network 110 can require express acceptance from the individual identified by token 106 prior to adding that individual to the community or as a node in transient network 110. Aside from the fact that registration to ICFP-2007 does not necessarily mean ICFP-2008 will also be attended, an express opt-in policy can mitigate various privacy concerns as well.

It should be understood that a particular network can be seeded not only from expired networks, but from those that are still currently active. In accordance with the above, appreciably, a variety of different scenarios can exist in which the data from one network can be employed to seed or populate a second network. For example, data (e.g. seed data 502, contact information . . . ) can be moved from a live, currently operational transient network 110 to an existing conventional network. Likewise, data can be obtained from an old transient network 110 that is no longer operational to an existing conventional network. As another example, a new live transient network 110 can be created based upon data sets from a concurrently existing live transient network 110. Furthermore, as detailed supra, a new live transient network 110 can be created based upon data sets from an old transient network 110 that is no longer operational.

It should also be appreciated that data included in tokens 106 can change over time such as when a particular registrant 202 moves, gets a new phone service, opens a new account with disparate social networking services 204, or the like. To further mitigate outdated or stale information, archival component 404 can keep all token 106 information as well as other data associated with registrant 202 stored in history 406 current based upon the most up-to-date information available. Returning to the previous example where Ashley intends to look up contact information for parties she met at the Technology Today conference who she recalls reside locally to her current travels. It should be appreciated that token 106 associated with one or more registrant 202 can reflect a move that occurred in the interim even though at the time of the conference that particular registrant 202 did reside locally and included that (then current, but now stale) data with his or her token 106. Hence, Ashley need not waste time or be inconvenience by attempting contact with outdated information.

Turning back to FIG. 4, system 400 can further include migration component 408 that can automatically submit contact information associated with a first registrant 202 to a service or device associated with a second registrant 202. Accordingly, even though transient network 110 is typically intended to be temporal in nature, building a transitory community around a particular event, all or portions of that community can be merged into existing social networks with more enduring structures or objectives. For example, it is readily apparent that at least for the duration of the event, the community organized by transient network 110 can be very desirable. Still, simply because registrant 202 meets and interacts with many potentially interesting individuals, such individuals and other data associated with the event need not occupy time or other resources personal to registrant 202 in perpetuity, hence the active deconstruction of transient network 110. On the other hand, it is also easily recognizable that in some cases, lasting friendships or other bonds can arise from such events.

In the latter case, registrant 202 might desire to import contact information 410 and other data to an existing social network. Thus, migration component 408 can provide contact information 410 in response to a request by registrant 202. Additionally or alternatively, migration component 408 can recommend or suggest registrant 202 import contact information 410 based upon a level of interaction between the first and the second registrant. For example, if the two registrants 202 often attend workshops, sessions, or outings together, share projects, exchange content or other information, and/or engage in other types of communication to a degree that surpasses some determined or inferred threshold, then migration component 408 can effectuate or suggest the import. In an aspect, such a migration can be based at least in part upon communication log 412, which can be supplied by a device or service associated with the registrant and can potentially include emails, phone calls, as well as transactions that occur by way of transient network 110. Appreciably, communication log 412, as with all or substantial portions of other personal or quasi-personal information described herein, can be provided on a voluntarily basis, as one objective of the claimed subject matter can be to provide ample security and respect potential privacy concerns. Accordingly, access to communication log 412 can be expressly contingent upon an opt-in policy.

Further still, system 400 can include broker component 414 that can utilize information associated with the event to facilitate incentives for one or more registrant 202. Such incentives 416 can originate from local or related business entities, which can be stored, manage, and/or solicited by server(s) 418. For instance, based potentially upon information associated with transient network 110, suitable incentives 416 can be selected or brokered by broker component 414 and provided to registrants 202. As one example, if event data 108 indicates that the event physically occurs in Denver, Colo., then incentives 416 from businesses (e.g., hotel or lodging) can be brokered. As another example, if transient network 110 consists of, say 50 registrants 202, then a second business might offer a product or service contingent upon, e.g. 30 of the 50 registrants 202 agreeing or committing to the offer.

Figure 6:
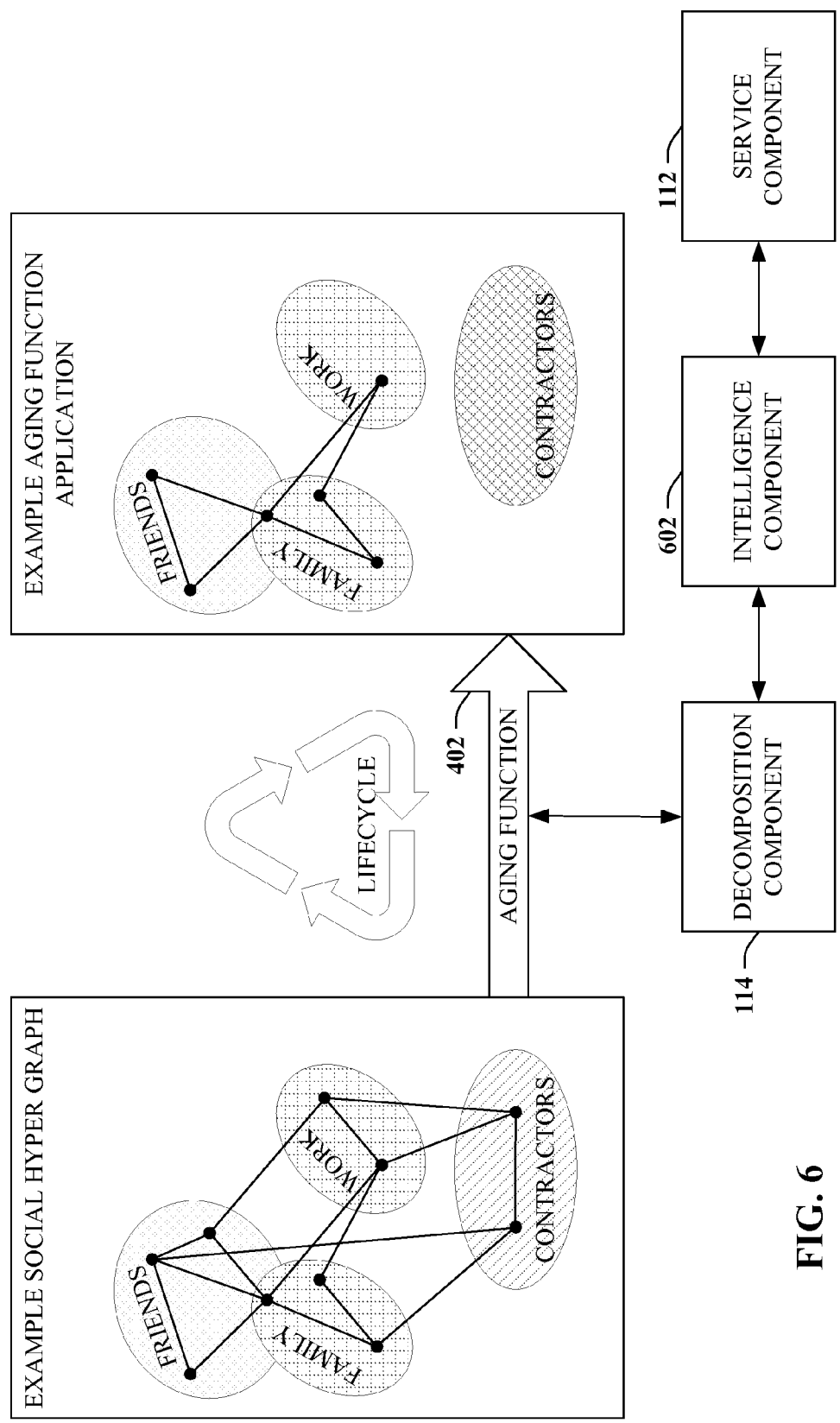
FIG. 6 is a block diagram of a system that can intelligently manage the lifecycle of computer-based social networks.

Referring now to FIG. 6, system 600 that can intelligently manage the lifecycle of computer-based social networks is provided. While much of the discussion provided thus far has focused on events of a particular nature, namely conferences, it should be appreciated that a wide variety of other types of events or activities can be utilized in connection with the claimed subject matter. Moreover, such events or activities need not be shared by the community who constitute transient network 110. Rather, for instance, the event or activity can be based upon a single perspective of one participant who sets up a more personalized community for his or her own personal benefit.

For example, a user, say Ashley from the previous set of examples, can apply portions of the claimed subject matter to her own social network and employ features of the aging function 402 to decay the network in a desired manner in order to, e.g., mesh with changing environments or circumstances, mitigate information overload, reduce "digital litter," improve resource utilization, optimize searches or content retrieval and so forth.

In accordance therewith, Ashley can input, migrate, or import one or more sets of contact information, which is represented by the example social hyper graph. Ashley's contacts can be categorized as sub-networks, which are here denoted as "Friends," "Family," "Work," and "Contractors." It should be appreciated and understood that other suitable sub-networks can be utilized without departing from the spirit or scope of the claimed subject matter. Moreover, a single contact can potentially exist in multiple sub-networks, e.g. a member of both Friends and Family. In addition, Ashley can specify or provide preferences or rules that affect aging function 402 according to her own desires or intentions.

Furthermore, aging function 402 can operate according to different rule sets for different sub-networks. For instance, contacts in the Friends sub-network can decay at a faster rate than work-related contacts when no communications or discoverable transactions occur. Thus, if Ashley fails to interact with a particular contact in any significant or meaningful way for a period of three months, then that contact can be decayed out of the Friends sub-network, whereas aging function 402 might allow a period of six months before decaying out a contact from the Work sub-network. Some sub-networks such as Family might have no time-oriented or duration-based component applied by aging function 402.

As indicated supra, aging function 402 can also decay the social network based upon changing environments or circumstances. For example, consider a case in which Ashley receives a promotion at work that involves a transfer to a different office. Furthermore, when Ashley moves, she sells her house and moves into a condominium. Accordingly, this change in circumstances can render obsolete the two contacts in the Contractors sub-network, which relate to landscaping and swimming pool cleaning—services no longer necessary for Ashley, or no longer suitable due to distance. Likewise, many contacts from the Work sub-network as well as some from the Friends sub-network may no longer be relevant or decay now at a faster rate. These and other circumstances can be accounted for by aging function 402, as illustrated by the second social hyper graph example after applying aging function 402. Naturally, although not expressly illustrated, it should be appreciated that Ashley can also easily add to the hyper graph as she meets or interacts with a new set of friends, business colleagues, contractors, etc.

Appreciably, decomposition component 114, as well as other components such as service component 112 can make various intelligence-based determinations or inferences. For example, decomposition component 114 can utilize or refine machine learning techniques associated with applying aging function 402 in accordance with an individual's preferences or rules. Additionally or alternatively, decomposition component 114 can employ Bayesian or stochastic principles or techniques to predict preferred actions or results based upon data aggregated from many sources. Likewise, service component 112 can employ such techniques when distinguishing which content to filter out and which content to propagate based upon the flow settings of flow modulator 304.

In addition, system 600 can also include intelligence component 602 that can provide for or aid in various inferences or determinations. It is to be appreciated that intelligence component 602 can be operatively coupled to decomposition component 114 and/or service component 112. Additionally or alternatively, all or portions of intelligence component 602 can be included in one or more components described herein. Moreover, intelligence component 602 will typically have access to all or portions of data sets described herein, such as data store 120, and can furthermore utilize previously determined or inferred data.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
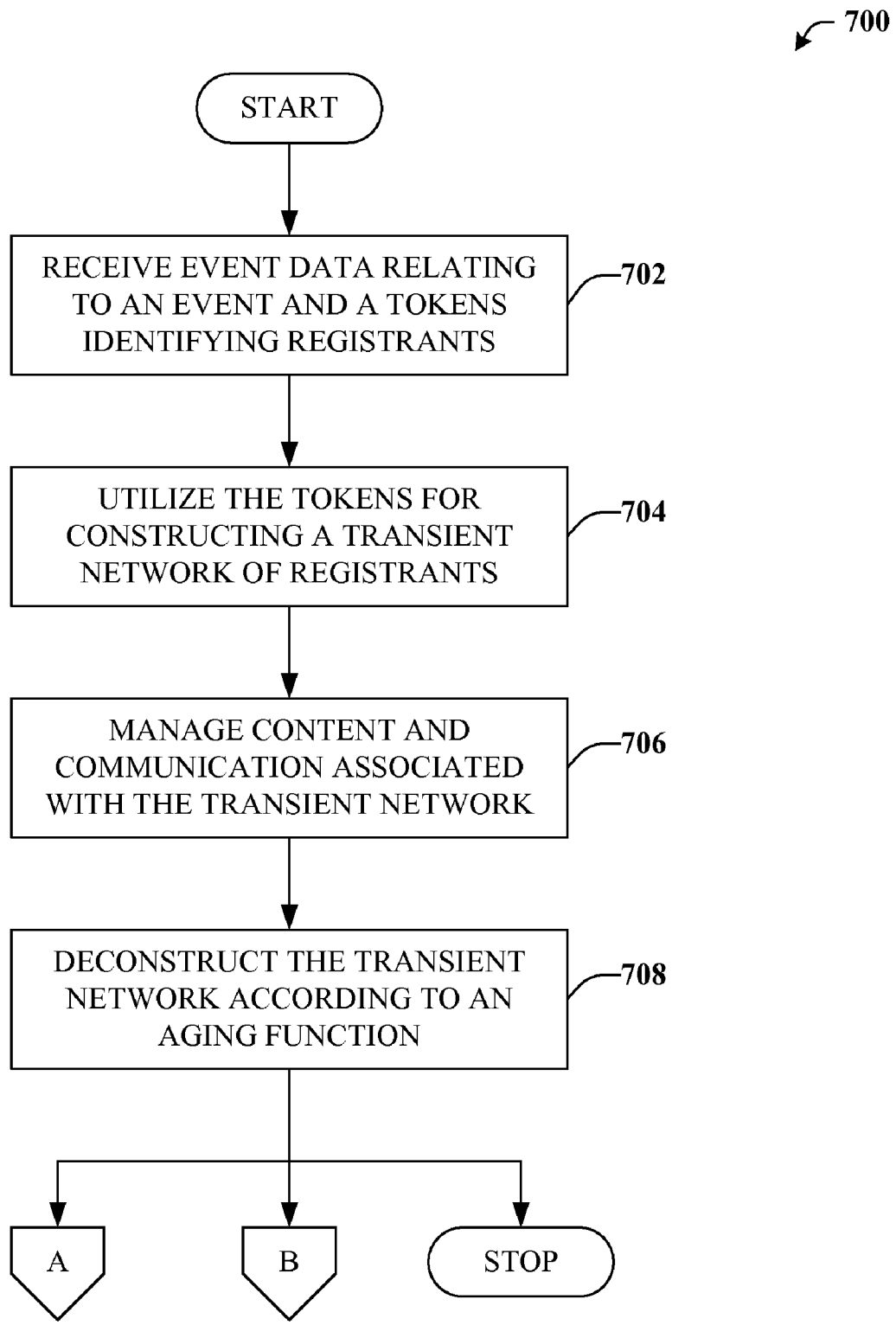
FIG. 7 depicts an exemplary flow chart of procedures that define a method for managing creation and destruction of event-oriented temporary networks.
Figure 8:
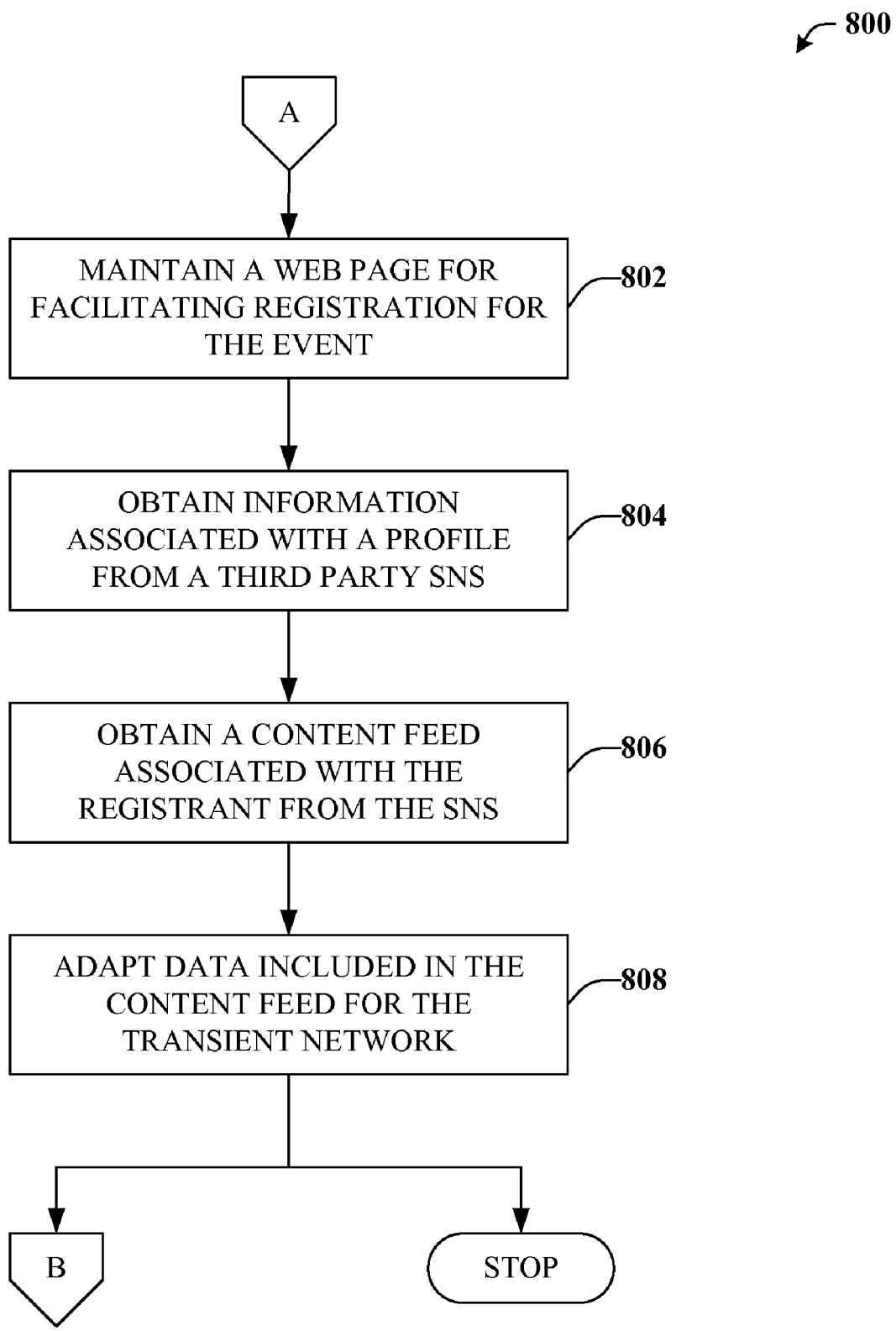
FIG. 8 illustrates an exemplary flow chart of procedures that define a method for providing additional features with respect to managing information associated with the temporary networks.
Figure 9:
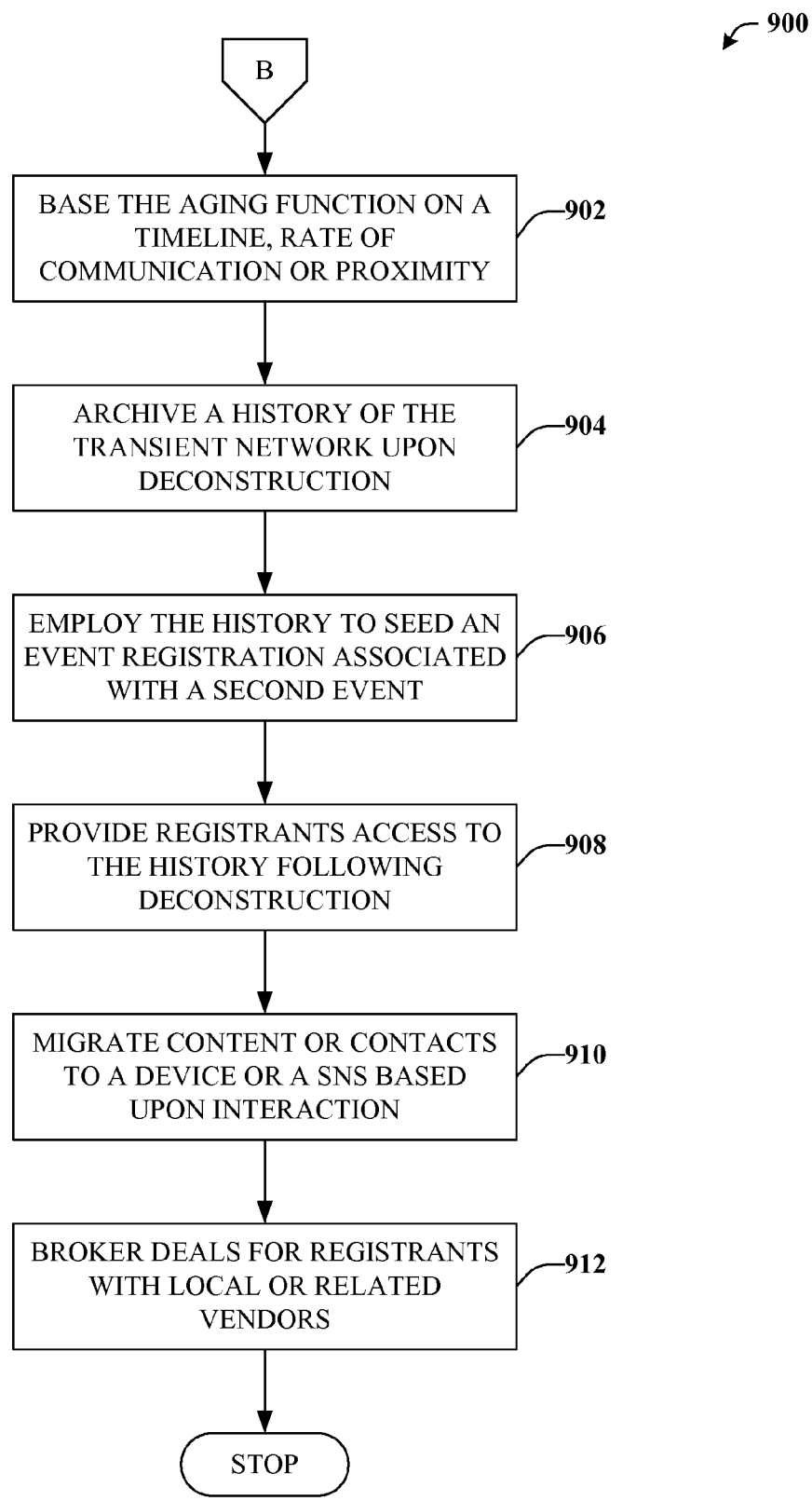
FIG. 9 depicts an exemplary flow chart of procedures defining a method for providing additional aspects or services associated with the life cycle of event-oriented temporary networks.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for managing creation and destruction of event-oriented temporary networks is illustrated. Generally, at reference numeral 702, event data relating to an event, project, or activity can be received. Event data can be manually input or imported automatically from a data source such as a calendar or scheduler. In addition, a set of tokens can also be received from one or more registrants, wherein each token can, inter alia, identify a registrant for the event. The token can include reference links to disparate social networking services and can also include profile information or links thereto. Typically, each token will refer to a unique individual or identity; however, it should be appreciated that a single individual can provide multiple tokens, including tokens for others such as friends or contacts to be included in the community.

At reference numeral 704, the set of tokens can be utilized for constructing a transient network by networking the identified registrants. In other words, a temporary community can be created comprising the registrants or otherwise those parties identified by a received token. At reference numeral 706, content and communication associated with the transient network can be managed. Next to be described, at reference numeral 708, the transient network can be deconstructed according to an aging function.

Referring to FIG. 8, exemplary computer implemented method 800 for providing additional features with respect to managing information associated with the temporary networks is depicted. At reference numeral 802, one or more web page or website can be maintained. These web-based pages can facilitate registration for the event as well as other suitable activity such as accessing historic data or changing settings or preferences.

At reference numeral 804, information associated with a profile for the registrant can be obtained from a third-party social networking service. Accordingly, existing profile data can be imported or otherwise leveraged for efficiency or convenience. Similarly, at reference numeral 806, a content feed associated with the registrant can be obtained from the same or another third-party social networking service. For example, blog posts, tweets, RSS feeds or the like associated with a registrant can be piped into the transient network during its life cycle. Appreciably, data included in the content feed can be adapted for the transient network at reference numeral 808.

With reference now to FIG. 9, method 900 for providing additional aspects or services associated with the life cycle of event-oriented temporary networks is illustrated. Generally, at reference numeral 902, the aging function detailed supra at reference numeral 708 of FIG. 7 can be based on a timeline for the event. For instance, if the event is scheduled to last a week, the aging function can decay the transient network so that it terminates in a similar time frame. As another example, the aging function can terminate the network at the expiration of the event or a short interval thereafter. In an aspect of the disclosed subject matter, the aging function can be based upon a rate of communication as well. For example, the rate of communication between various registrants and/or the aggregate amount of communication for the transient network as a whole can be factors that affect the rate of decay or the portions or sequence of decay. Moreover, the aging function can also be based upon proximity, such as proximity between various registrants during the event and/or proximity of a registrant to a site associated with the event.

At reference numeral 904, a history of the transient network can be archived upon decommission or deconstruction of the transient network. The history can include information associated with the event data described at reference numeral 702 and/or information associated with tokens detailed at reference numeral 704 as well as, in some cases, information associated with content and communication introduced at reference numeral 706. Archival of such data can serve a number of useful purposes.

For example, at reference numeral 906, the history can be employed to seed an event registration associated with a related event. One example of such can be to utilize the history to seed cyclical or reoccurring events. In particular, utilize the history of a prior event to seed a subsequent one in the cycle. At reference numeral 908, access to the history can be provided to registrants following deconstruction of the transient network. For instance, even though a particular transient network way expired, certain information associated therewith can be accessible to registrant to provide ready data lookup.

At reference numeral 910, various content and/or a one or more contact can be migrated to a device or third-party social networking service associated with the registrant. This data migration can be automatic or specifically requested by the registrant and can be based upon a level of interaction between the registrant and other registrants. For example, if, during the life cycle of the transient network two particular registrants maintain a high level to interaction, then both registrants can migrate information included in the transient network to extant and more permanent social networks. At reference numeral 912, deals for registrants of the transient network can be brokered with local or related vendors or business entities. For example, if the event relates to a material interest, then deals or incentives from vendors of related products or services can be selected. As another example, if the event is located at a specific location or site, then incentives from local vendors can be brokered.

Figure 10:
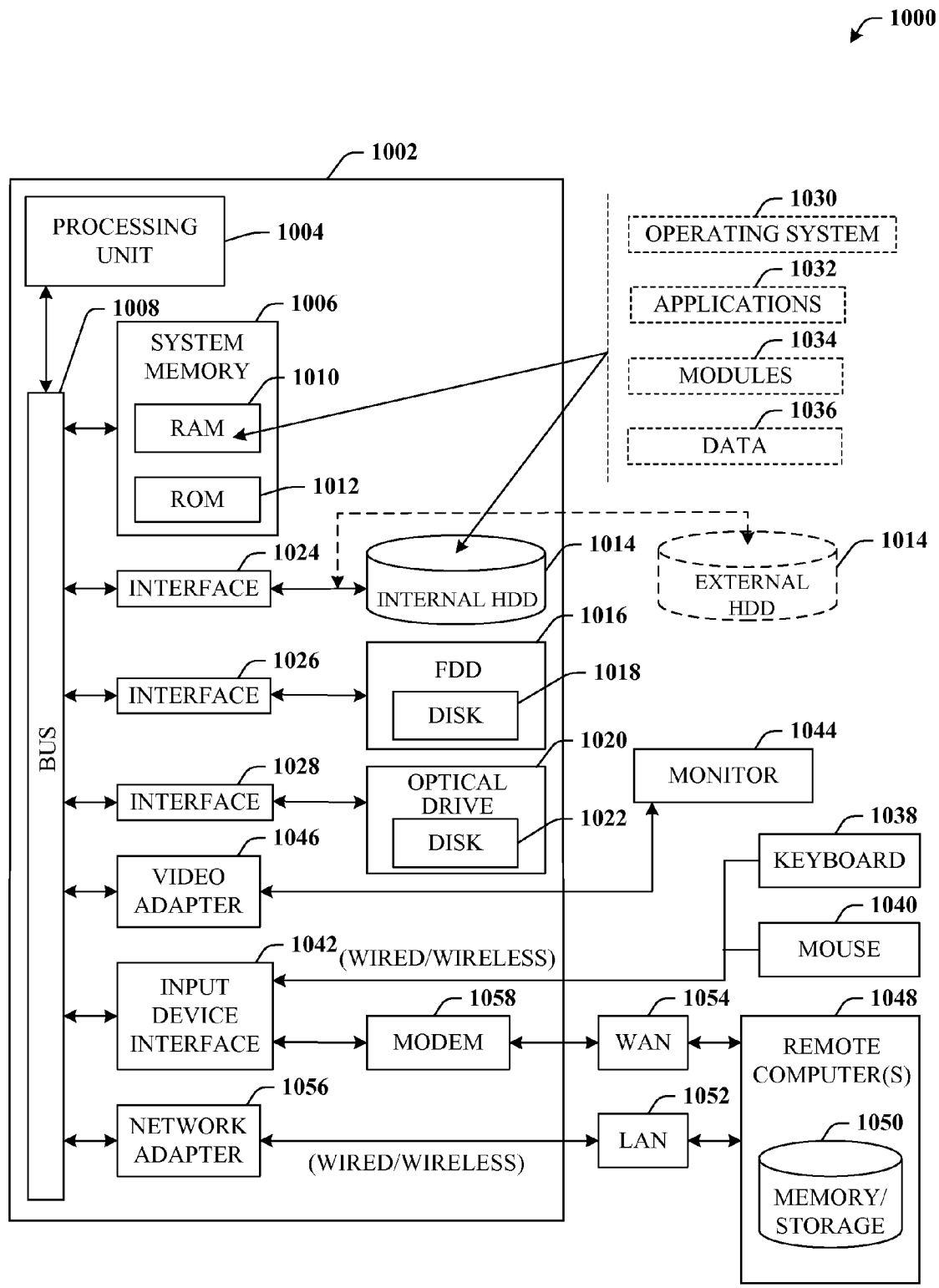
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
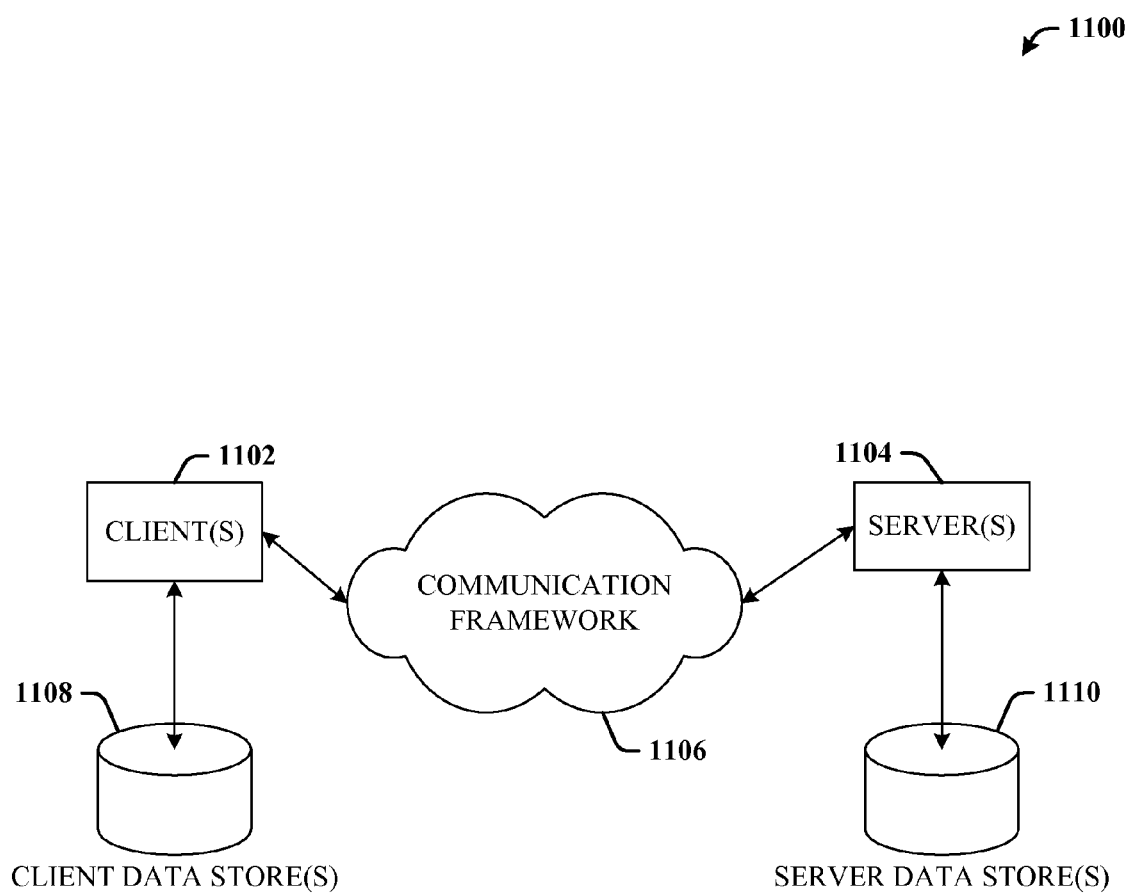
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that facilitates termination of an event-oriented transient network, comprising:
a processor;
memory having stored computer-executable instructions that, when executed at the processor, configure the processor to implement:
a registration component that receives event data associated with an event and a set of tokens, each token identifies a registrant for the event, wherein the registration component is configured to import profile data associated with the registrant from one or more third-party social networking services, based at least in part on the token identifying the registrant;
a composition component that constructs a transient network comprising nodes associated with indentified registrants, the transient network is a temporary social networking computer-based network;
a service component that manages content and communication associated with the transient network, wherein the service component is configured to receive content feeds from the one or more third-party social networking services and selectively present the content feeds to the registrant based on a preference of the registrant; and
a decomposition component that dismantles the transient network according to an aging function, the aging function triggering the dismantle of the transient network when a rate of communication of the identified registrants diminishes by a preset amount.

2. The system of claim 1, further comprising a migration component that automatically submits contact information associated with a first registrant to a service or device associated with a second registrant.

3. The system of claim 2, the migration component submits the contact information based upon a level of interaction between the first and second registrants.

4. The system of claim 3, the level of interaction is determined based upon a communication log or a transaction log.

5. The system of claim 1, further comprising an archival component that stores a history of the transient network, the history includes all or a subset of the event data and the set of tokens.

6. The system of claim 5, the history is utilized to seed event registration for a related event.

7. The system of claim 5, the history remains accessible to the registrant during or after the associated transient network is decayed, and the history is updated to reflect changes to contact information associated with the registrant.

8. The system of claim 1, the registration component maintains a web page, a list, a service, or a host for client applications to facilitate registration associated with the event.

9. The system of claim 1, the token includes a link to a profile from a disparate social networking service.

10. The system of claim 1, the service component employs an adapter that translates the content feeds into a format suitable for the transient network.

11. The system of claim 1, the service component employs a flow modulator to at least one of control, prioritize, or filter content presented to the registrant.

12. The system of claim 1, the aging function is based upon a timeline for the event.

13. The system of claim 1, the aging function is based upon at least one of a rate of communication for a registrant, a rate of communication with a second registrant, an aggregate rate of communication for multiple registrants, a type or quality of communication content, or a proximity to an event site or other registrants.

14. The system of claim 1, the aging function is described by information included in the event data.

15. The system of claim 1, further comprising a broker component that utilizes information associated with the event to facilitate incentives for the registrant from local or related business entities.

16. A computer implemented method operable on a processor for creating, managing and destroying of event-oriented temporary networks, the method comprising:
receiving, at the processor, event data relating to an event and further receiving a set of tokens, each token identifying a registrant for the event;
importing profile data associated with the registrant from one or more third-party social networking services, based at least in part on the token identifying the registrant;
utilizing the set of tokens for constructing a transient network by networking the identified registrants;
managing content and communications associated with the transient network;
receiving content feeds from the one or more third-party social networking services;
selectively presenting the content feeds to the registrant based on a preference of the registrant; and
decaying the transient network according to an aging function, the aging function triggering termination of the transient network when a rate of communication of the identified registrants diminishes by a preset amount.

17. The method of claim 16, further comprising at least one of the following acts:
maintaining a web page, list, service or application for facilitating registration for the event;
obtaining information associated with a profile for the registrant from a third party social networking service;
obtaining a content feed associated with the registrant from the third party social networking service; or adapting data included in the content feed for the transient network.

18. The method of claim 16, further comprising at least one of the following acts:
basing the aging function on at least one of a timeline for the event, a rate of communication, or a proximity;
archiving a history of the transient network upon deconstruction of the transient network or a state during a lifecycle of the transient network;
employing the history to seed an event registration associated with a second event;
providing registrants access to the history following deconstruction of the transient network;
migrating at least one of content or a set of contacts to a device or a third party social networking service based upon a level of interaction; or brokering deals for registrants with local or related vendors.

19. A computer implemented system that facilitates creation, management, and termination of an event-oriented temporary network, comprising:

a processor;

memory having stored computer-executable instructions that, when executed at the processor, configure the processor to implement:

a registration component that receives event data for an event and further receives a set of tokens, each token identifies a registrant for the event, wherein the registration component is configured to import profile data associated with the registrant from one or more third-party social networking services, based at least in part on the token identifying the registrant;

a composition component that constructs a transient network comprising nodes associated with indentified registrants, the transient network is a temporary social networking communication network;

a service component that manages content and communication associated with the transient network, wherein the service component is configured to receive content feeds from the one or more third-party social networking services and selectively present the content feeds to the registrant based on a preference of the registrant; and a decomposition component that terminates the transient network according to an aging function, the aging function triggering termination of the transient network when a rate of communication of the identified registrants diminishes by a preset amount.

* * * * *